US010724467B2

United States Patent
Koeberlein et al.

(10) Patent No.: US 10,724,467 B2
(45) Date of Patent: Jul. 28, 2020

(54) PISTONS WITH THERMAL BARRIER COATINGS

(71) Applicant: CUMMINS INC., Columbus, IN (US)

(72) Inventors: David E. Koeberlein, Columbus, IN (US); J. Steven Kolhouse, Columbus, IN (US)

(73) Assignee: Cummins Inc., Columbus, IN (US)

( * ) Notice: Subject to any disclaimer, the term of this patent is extended or adjusted under 35 U.S.C. 154(b) by 244 days.

(21) Appl. No.: 15/796,302

(22) Filed: Oct. 27, 2017

(65) Prior Publication Data

US 2018/0128202 A1 May 10, 2018

Related U.S. Application Data

(60) Provisional application No. 62/417,463, filed on Nov. 4, 2016.

(51) Int. Cl.
| | |
|---|---|
| *F02F 3/14* | (2006.01) |
| *F02F 3/00* | (2006.01) |
| *C23C 28/04* | (2006.01) |
| *C23C 28/00* | (2006.01) |
| *F02F 3/04* | (2006.01) |
| *F02B 75/28* | (2006.01) |

(Continued)

(52) U.S. Cl.
CPC .............. *F02F 3/14* (2013.01); *C23C 28/042* (2013.01); *C23C 28/3215* (2013.01); *C23C 28/3455* (2013.01); *F01B 7/02* (2013.01); *F01B 7/14* (2013.01); *F02B 23/06* (2013.01); *F02B 75/28* (2013.01); *F02B 75/282* (2013.01); *F02F 3/0084* (2013.01); *F02F 3/04* (2013.01); *F02F 3/26* (2013.01); *F02F 3/22* (2013.01); *Y02T 10/125* (2013.01)

(58) Field of Classification Search
CPC .......... F02F 3/14; C32C 28/3455; F01B 7/02; F01B 7/14; F02B 23/06
See application file for complete search history.

(56) References Cited

U.S. PATENT DOCUMENTS

| | | | |
|---|---|---|---|
| 5,560,283 A | 10/1996 | Hannig | |
| 6,256,984 B1 * | 7/2001 | Voss | B01D 53/944 422/180 |

(Continued)

FOREIGN PATENT DOCUMENTS

CN 102226427 10/2011

OTHER PUBLICATIONS

Non-Final Office Action on U.S. Appl. No. 15/809,358 dated Jul. 30, 2018.

(Continued)

*Primary Examiner* — Kevin A Lathers
(74) *Attorney, Agent, or Firm* — Foley & Lardner LLP (57) ABSTRACT

A piston for an opposed-piston engine has a thermal barrier coating on at least the piston crown. The piston, at least the piston crown, is made of titanium or a titanium alloy. The thermal barrier coating includes a bonding material and a ceramic material. The bonding material can be present in the thermal barrier coating at an interface of the thermal barrier coating and the bulk of the piston material. The ceramic material can be a high R-Value material. In particular, the piston with a thermal barrier coating can be an exhaust piston for an opposed-piston engine.

33 Claims, 6 Drawing Sheets

(51) Int. Cl.
*F02F 3/26* (2006.01)
*F02B 23/06* (2006.01)
*F01B 7/14* (2006.01)
*F01B 7/02* (2006.01)
*F02F 3/22* (2006.01)

(56) References Cited

U.S. PATENT DOCUMENTS

| | | | |
|---|---|---|---|
| 7,549,401 | B2 | 6/2009 | Lemke et al. |
| 8,087,389 | B2 | 1/2012 | Lemke et al. |
| 9,163,505 | B2 | 10/2015 | Dion et al. |
| 9,810,174 | B2 | 11/2017 | Wahl et al. |
| 2006/0042575 | A1 | 3/2006 | Schmuecker et al. |
| 2007/0084449 | A1 | 4/2007 | Najt et al. |
| 2010/0326394 | A1* | 12/2010 | Hofbauer .............. F16J 9/206 123/196 R |
| 2011/0114038 | A1 | 5/2011 | Lemke et al. |
| 2011/0271932 | A1 | 11/2011 | Fuqua et al. |
| 2012/0080004 | A1 | 4/2012 | Menezes et al. |
| 2013/0112175 | A1 | 5/2013 | Wahl et al. |
| 2013/0220115 | A1 | 8/2013 | Kantola et al. |
| 2014/0090625 | A1 | 4/2014 | Dion et al. |
| 2014/0102294 | A1 | 4/2014 | Klein |
| 2014/0196439 | A1* | 7/2014 | Dolan .............. F01L 3/04 60/274 |
| 2014/0255617 | A1 | 9/2014 | Sasaki |
| 2015/0252715 | A1 | 9/2015 | MacKenzie |
| 2016/0069293 | A1 | 3/2016 | McClearen et al. |
| 2016/0252065 | A1 | 9/2016 | Johnson et al. |
| 2017/0145914 | A1 | 5/2017 | Lineton et al. |
| 2017/0254261 | A1 | 9/2017 | Morton et al. |
| 2017/0335752 | A1 | 11/2017 | Morton |

OTHER PUBLICATIONS

Non-Final Office Action on U.S. Appl. No. 15/898,047 dated Aug. 21, 2019.

* cited by examiner

PISTONS WITH THERMAL BARRIER COATINGS

CROSS-REFERENCE TO RELATED APPLICATIONS

This application claims the benefit of priority to U.S. Provisional Patent Application No. 62/417,463, filed on Nov. 4, 2016, titled "PISTONS WITH THERMAL BARRIER COATINGS FOR OPPOSED-PISTON ENGINES," and is hereby incorporated by reference in its entirety.

RELATED APPLICATIONS

This Application contains subject matter related to the subject matter of concurrently-filed U.S. Provisional Application No. 62/417,499, titled "PISTONS WITH THERMAL BARRIER COATINGS FOR OPPOSED-PISTON ENGINES," and hereby incorporated by reference in its entirety.

STATEMENT REGARDING FEDERALLY SPONSORED RESEARCH

This invention was made with government support under NAMC Project Agreement No. 69-201502 awarded by the NATIONAL ADVANCED MOBILITY CONSORTIUM (NAMC), INC. The government has certain rights in the invention.

FIELD

The present disclosure relates to piston thermal management constructions for uniflow-scavenged opposed-piston, internal combustion engines.

BACKGROUND

When compared to conventional "Vee" and straight-inline internal combustion engines with a single piston in each cylinder, opposed-piston engines possess architectural advantages in thermodynamics and combustion that can deliver improvements in measures of engine performance. However, uniflow-scavenged, opposed-piston engines characteristically have thermal requirements that are different from engines that have one piston per cylinder, and thus thermal management techniques differ. The difference in thermal requirements occurs in uniflow-scavenged opposed-piston engines due to the nature of charge air flow into and exhaust flow from the cylinders in these engines.

During scavenging in a uniflow-scavenged, opposed-piston engine, the predominant fluid flow is unidirectional, that is to say, charge air flows through the intake port of a cylinder and exhaust flows out of the cylinder's exhaust port. Because the air entering the cylinder is cooler than the exhaust, the exhaust portion of the cylinder and the exhaust piston that moves across the exhaust port are exposed to greater heat and higher temperatures than the intake portion of the cylinder and the intake piston that moves across the intake port. Thus, the unidirectional flow of air and exhaust leads to exposure of the opposite ends of a cylinder to different temperature profiles. Additionally, in a two-stroke cycle of uniflow-scavenged, opposed-piston engines, there is less time for piston cooling between firing or combustion events, so the difference in thermal environments that the exhaust and intake pistons are exposed to is even more pronounced as compared to engines that have one piston per cylinder.

SUMMARY

In some embodiments of the present disclosure, a piston for use in an opposed-piston internal combustion engine comprises a substantially cylindrical portion including a sidewall. The piston further comprises a piston crown located at an end of the piston, the piston crown comprising an end surface structured to form a combustion chamber when disposed within a cylinder bore in cooperation with an end surface of a cooperating opposing piston, the piston crown further comprising titanium or a titanium alloy. The piston also comprises a thermal barrier coating on the piston crown.

In some embodiments of the present disclosure, a method for making a piston for an opposed-piston engine comprises providing a piston comprising a substantially cylindrical portion including a sidewall, and a piston crown located at an end of the piston, the piston crown comprising an end surface structured to form a combustion chamber when disposed within a cylinder bore in cooperation with an end surface of a cooperating opposing piston. The method further comprises depositing a bonding layer including a bonding material on the end surface of the piston crown. The method also comprises depositing at least one thermal barrier layer comprising ceramic material above the bonding layer.

In some embodiments of the present disclosure, a piston for use in an opposed-piston internal combustion engine comprises a substantially cylindrical portion including a sidewall, and a piston crown located at an end of the piston, the piston crown comprising an end surface structured to form a combustion chamber when disposed within a cylinder bore in cooperation with an end surface of a cooperating opposing piston, the piston crown comprising titanium or titanium alloy.

In some embodiments of the present disclosure, a piston arrangement for a uniflow-scavenged, opposed-piston engine includes features for adapting to variations in thermal conditions between an intake end and an exhaust end of a cylinder in the opposed-piston engine.

In some embodiments of the present disclosure, a uniflow-scavenged opposed-piston engine comprises at least one cylinder with piston arrangement that has features for adapting to variations in thermal conditions between an intake end and an exhaust end of the cylinder.

In a related aspect, a method is provided, in which the method comprises preparation of an exhaust piston using a construction and/or material that is not used in the creation of an opposing intake piston for a uniflow-scavenged, opposed-piston engine, wherein the construction and/or material of the exhaust piston comprises features for adapting to variations in thermal conditions between an intake end and an exhaust end of a cylinder in the opposed-piston engine.

The following features may be combined in any suitable manner in the piston, the uniflow-scavenged opposed-piston engine, and/or the method described herein. The features for adapting to variations in thermal conditions between the intake and exhaust end may include the use of different materials for an exhaust piston from those used for an intake piston in the uniflow-scavenged opposed-piston engine. The materials used for the exhaust piston may include materials that have high strength at high temperature, materials that have a small coefficient of thermal expansion, and/or materials that are poor conductors of heat. In some implementations, the crown of the exhaust piston may be made of a different material than the crown of the intake piston; for example the material may include a material that has high strength at high temperature, a material that has a small coefficient of thermal expansion, and/or a material that is a poor conductor of heat (e.g., a thermal insulator). The material used for portions of or all of the exhaust piston, such as for the exhaust piston's crown, that is different from the material used for the intake piston, can include in some embodiments titanium, a titanium alloy, nickel, a nickel alloy, a ceramic material, a composite material (e.g., a glass or ceramic reinforced polymer composite), a cermet, or a combination of two or more of these. The exhaust piston can have a thermal barrier coating, and in some implementations, the thermal barrier coating can be a layer of a single material or the thermal barrier coating can include multiple layers of two or more materials. In some embodiments, the exhaust piston comprises a titanium alloy with a ceramic coating that comprises yttria stabilized zirconia.

DETAILED DESCRIPTION OF VARIOUS EMBODIMENTS

Figure 1:
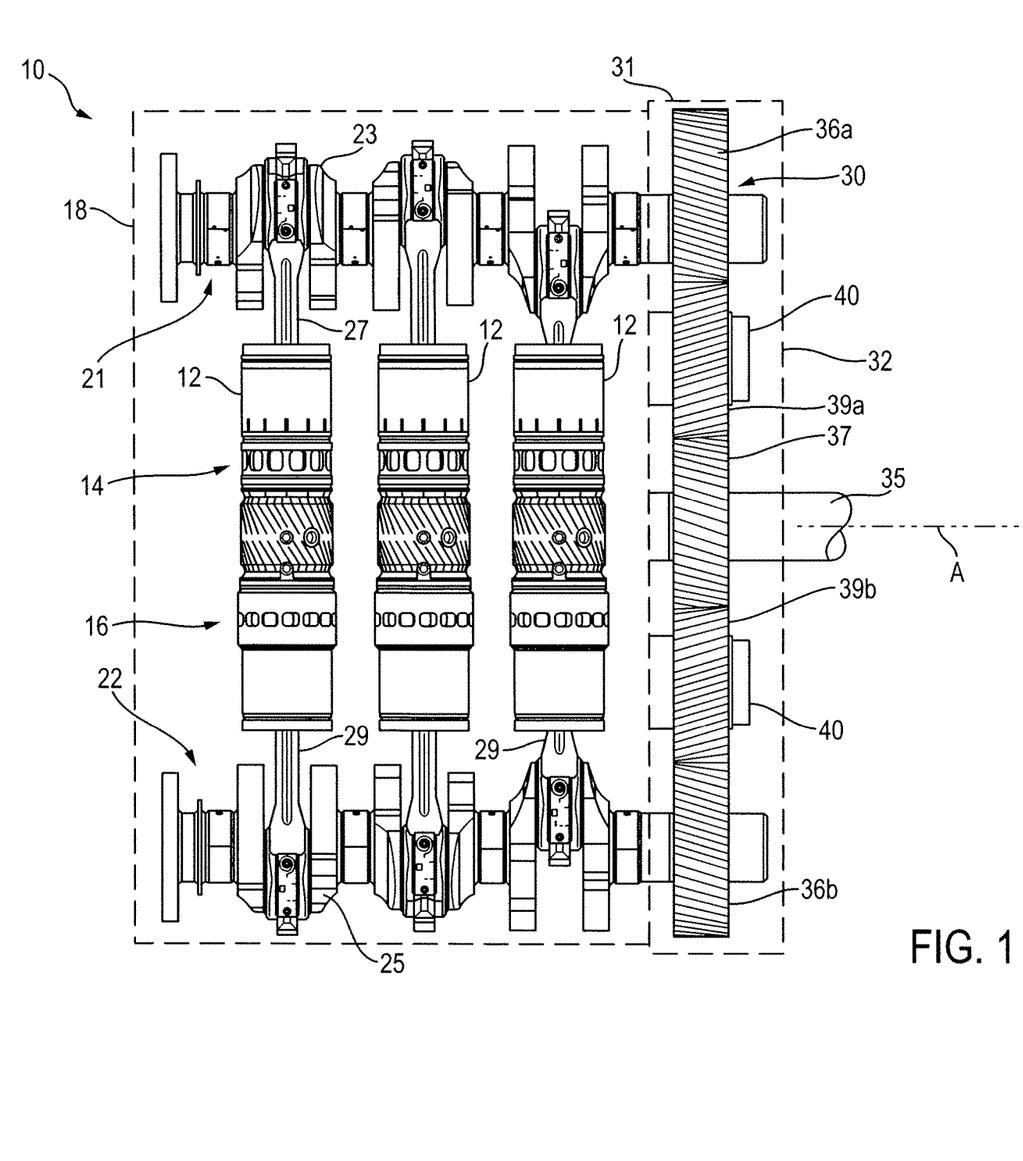
FIG. 1 depicts a side elevation view of an example arrangement of cylinders, pistons, and a gear train in an opposed-piston engine.

FIG. 1 depicts an example of an opposed piston engine 10 including an arrangement of cylinders, pistons, and crankshafts with an associated gear train. The figure shows a three-cylinder arrangement, although this is not intended to be limiting; in fact, the basic architecture portrayed in FIG. 1 is applicable to opposed-piston engines with fewer, or more, cylinders. The opposed-piston engine 10 includes multiple cylinders 12, each cylinder 12 including exhaust ports 14 and intake ports 16. The cylinders may include liners (also called "sleeves") that are fixedly mounted in tunnels formed in an engine frame or block 18. A pair of pistons (not visible in this figure) is disposed for opposing reciprocal movement in a bore of each cylinder 12 (or in the cylinder liner). In the example of FIG. 1, the opposed-piston engine 10 includes an interlinked crankshaft system comprising two rotatably-mounted crankshafts 21 and 22 and a crankshaft gear train 30 linking the crankshafts and coupling them to a power take-off shaft ("PTO shaft") 35. The crankshafts 21 and 22 are mounted to the engine, for example, by main bearing arrangements (not shown), one at the bottom of the engine block 18 and the other at the top. The crankshaft gear train 30 is supported in one end of the engine block 18 and is contained in a compartment 31 therein that can be accessed, for example, through a removable cover 32.

In FIG. 1, one piston of each piston pair is coupled to a respective crank journal 23 of the crankshaft 21 by a connecting rod assembly 27; the other piston is coupled to a respective crank journal 25 of the crankshaft 22 by a connecting rod assembly 29. The crankshafts 21 and 22 are disposed with their longitudinal axes in a spaced-apart, parallel arrangement. The crankshaft gear train 30 includes a plurality of gears, including, for example, two input gears 36a and 36b, which are fixed to respective ends of the crankshafts 21 and 22 for rotation therewith. In the embodiment illustrated in FIG. 1, an output gear 37 is mounted on the PTO shaft 3 and drives the PTO shaft 35 about an output axis of rotation A. In this configuration, two idler gears 39a and 39b are provided, each mounted for rotation on a fixed shaft or post 40. The idler gear 39a meshes with the input gear 36a and the output gear 37; the idler gear 39b meshes with the input gear 36b and the output gear 37. As a result of the configuration of the crankshaft gear train 30, the crankshafts 21 and 22 are co-rotating, that is to say, they rotate in a same direction. However, this is not meant to limit the scope of the present disclosure. In fact, a gear train construction according to the present disclosure may have fewer, or more, gears, and may have counter-rotating crankshafts. Thus, although five gears are shown for the crankshaft gear train 30, the numbers and types of gears for any particular crankshaft gear train are dictated by engine design. For example, the crankshaft gear train 30 may comprise one idler gear for counter-rotation, or two idler gears (as shown) for co-rotation.

Figure 2:
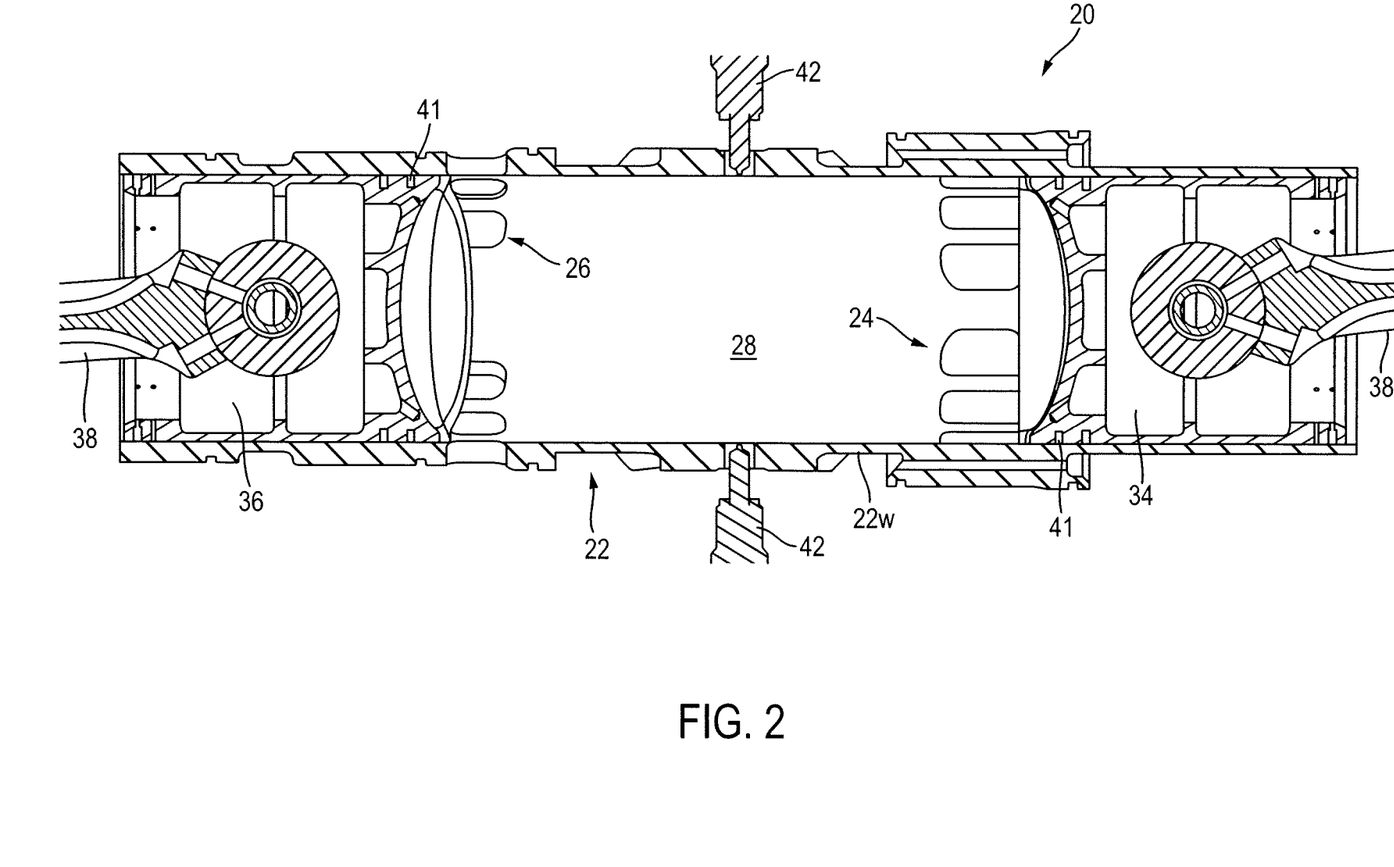
FIG. 2 depicts a longitudinal cross-sectional view of an example of a cylinder of an opposed-piston engine constructed for two stroke-cycle operation.

FIG. 2 depicts an example of a portion of an opposed-piston engine 20 constructed for two stroke-cycle operation. The opposed-piston engine 20 includes a cylinder 22 with exhaust ports 24 and intake ports 26 formed in a sidewall 22w of the cylinder 22 near respective ends of the cylinder 22. The opposed-piston engine 20 includes at least the one cylinder 22, and may include two, three, or more cylinders similar to or different from the cylinder 22. The cylinder 22 may include a cylinder liner or sleeve supported in a block, a frame, a spar, or other structure. The cylinder sidewall 22w defines a cylindrical bore having a bore surface 28. Openings of the exhaust ports 24 and intake ports 26 are formed near respective ends of the sidewall 22w and open through the bore surface 28. A pair of pistons 34 and 36 is disposed for opposed sliding movement on the bore surface 28. Each of the pistons 34 and 36 is coupled by a respective connecting rod 38 (e.g., a portion of the connecting rod assembly 27 or 29 in FIG. 1) to a respective one of two crankshafts (e.g., as shown in FIG. 1). Each of the pistons 34 and 36 is equipped with one or more rings 41 that are mounted in annular grooves in crowns of the pistons 34 and 36.

The pistons 34 and 36 are shown at respective positions slightly after scavenging has commenced. The piston 34 has moved away from its bottom dead center (BDC) position at one end of the bore, and the exhaust ports are partially covered by the piston 34 but are still nearly fully open. The piston 36 has moved away from its BDC position at another end of the bore, and the intake ports 26 are partially covered by the piston 36. The exhaust ports 24 allow for transport of exhaust gas out of the cylinder 22, and the intake ports 26 allow for transport of charge air into the cylinder 22. As motion of the pistons 34 and 36 continues, the piston 34 will move from its BDC location toward its top dead center (TDC) position in the interior of the bore, closing the exhaust ports 24. The piston 36 will continue to move from BDC toward its TDC position in the interior of the bore, closing the intake ports 26 as the piston 36 moves toward TDC. After the intake ports 26 and the exhaust ports 24 are closed, and as the pistons 34 and 36 continue to move closer together, charge air is compressed between end surfaces of the pistons 34 and 36. Fuel injected (e.g., through the sidewall 22w of the cylinder via injectors 42) mixes with the pressurized charge air, ignites, and drives pistons 34 and 36 from TDC to BDC in an expansion stroke.

During operation of the engine 20, the intake ports 26 and the piston 36 are exposed predominantly to charge air, while the exhaust ports 24 and the piston 34 are exposed to exhaust gas for extended periods of time. The exhaust gas is at a high temperature relative to the charge air. Prolonged and repeated exposure to exhaust gas throughout operation of the engine 20 can result in temperatures reached by the exhaust ports 24 and exhaust piston 34 at an exhaust end of the cylinder 22 being significantly greater than temperatures reached by the intake ports 26 and the piston 36 at an intake end of the cylinder 22. In an engine 20 where both pistons 34 and 36 are similarly constructed, such as with a similar structure and from the same materials, the piston design may not be optimal for one or both of the pistons 34 and 36 (e.g., the intake piston 36 may be over-designed for the intake temperatures, the exhaust piston 34 may be under-designed for the exhaust temperatures, or both). Such a non-optimal design can be costly in terms of materials, or in terms of life span of the exhaust piston 34.

According to embodiments of the present disclosure, exhaust pistons (e.g., the exhaust piston 34) are constructed differently from intake pistons (e.g., the intake piston 36). The exhaust pistons described below have features that allow an engine (e.g., the engine 10 or 20) to be compensated for, or adapted to, the different thermal conditions experienced at the intake end of the cylinder versus the exhaust end of the cylinder in a uniflow-scavenged opposed-piston engine, without sacrificing strength or cost.

Figure 3A:
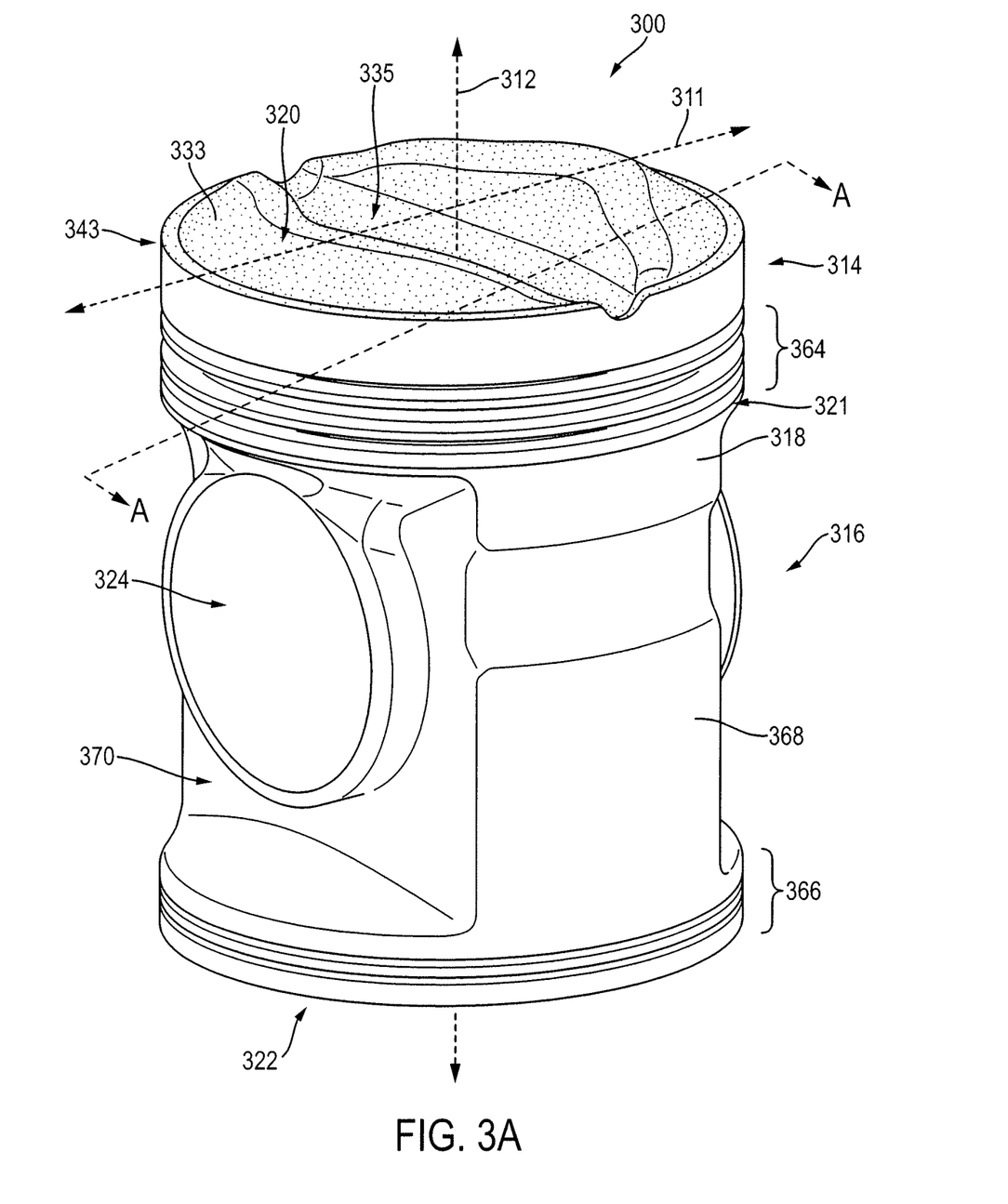
FIG. 3A depicts an example exhaust piston for a uniflow-scavenged opposed-piston engine.
Figure 3B:
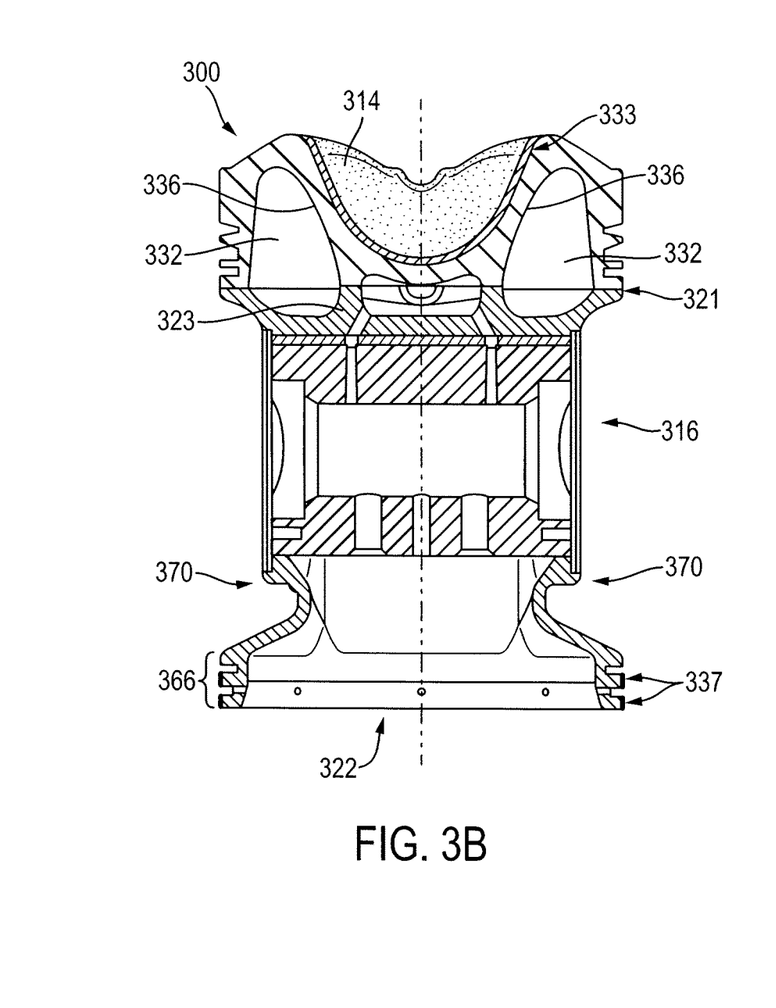
FIGS. 3B and 3C depict cross-sectional representations of the example exhaust piston shown in FIG. 3A.
Figure 3C:
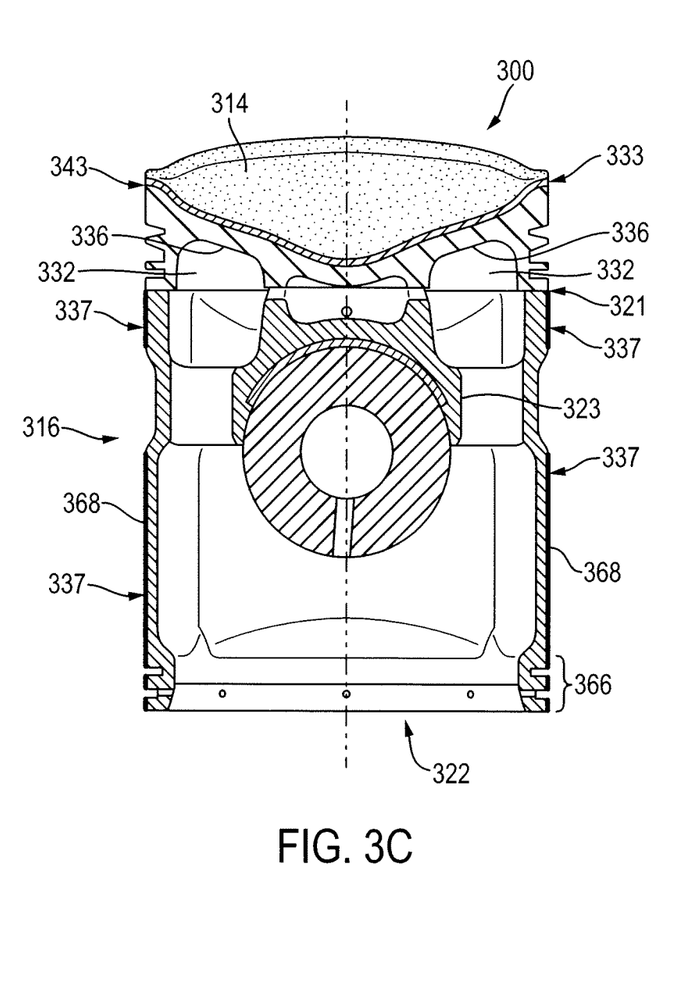

FIG. 3A depicts an example of a piston 300 for use with a uniflow-scavenged opposed-piston engine. FIGS. 3B and 3C depict cross-sectional representations of the piston 300 shown in FIG. 3A. Specifically, FIG. 3B depicts a cross-sectional representation of the piston 300 through a plane that includes a longitudinal axis 312 of the piston 300 and a first cross-sectional axis 311, and FIG. 3C depicts a cross-sectional representation of the piston 300 through a plane that includes the longitudinal axis 312 of the piston 300 and a second cross-sectional axis orthogonal to the first cross-sectional axis 311. In one or more embodiments, the piston 300 can be used to implement pistons 34 and/or 36 in the opposed piston engine 20 discussed above in relation to FIG. 2.

Referring to FIG. 3A-3C, the piston 300 includes a crown 314 and a skirt part 316. In one or more embodiments, the crown 314 can be attached to, affixed to, or manufactured with the skirt part 316. For example, in one or more embodiments, the crown 314 can be welded to the skirt part 316. In some other embodiments, the crown 314 can be manufactured in a mold that is also used for manufacturing the skirt part 316.

The piston 300 includes a sidewall 318 which is generally cylindrical and extends along the longitudinal axis 312 from an end 343 of the piston 300 to a first end 321 of the skirt part 316, and from the first end 321 to a second end 322 of the skirt part 316. The second end 322 of the skirt part 316 is structured to allow for engagement of a connecting rod with the piston 300. The skirt part 316 defines a wristpin bore 324 in which a wristpin (not shown) is received and retained to engage the connecting rod with the wristpin. An outer peripheral surface of the crown 314 is formed with a first set of ring grooves 364. A second set of ring grooves 366 is formed in a portion of the sidewall 318 near the second end 322 of the skirt part 316. During engine operation, rings positioned in the piston ring grooves 364 and 366 prevent blow-by and undesirable burning of lubrication oil.

The sidewall 318 is formed with opposing sidewall portions 368 separated from one another by intervening sidewall indentations 370. For example, there are two opposing side wall sections 368 and two opposing indentations 370. Relative to the longitudinal axis 312, the portions 368 of the sidewall 318 have approximately a same radius as the crown 314. The indentations 370 can minimize both a mass of the piston and a contact area of the sidewall 318 against a bore of a cylinder in which the piston is disposed. The indentations 370 run longitudinally in the sidewall 318 between the first ring grooves 364 and the second ring grooves 366.

The crown 314 has an end surface 320 shaped to define a combustion chamber with an end surface of an opposing piston in the opposed-piston engine. In one or more embodiments, the end surface 320 can be a concave surface, a convex surface, a flat surface, or a combination thereof. The end surface 320 includes a depression 335 extending across the crown 314. Each end of the depression 335 is configured to align with a location of a respective fuel injector along the cylinder bore in which the piston 300 is disposed at a particular position of the piston 300 within the cylinder bore.

In one or more embodiments, the end surface 320 of the crown 314 can be formed of one or more materials such as titanium or titanium alloy. In one or more embodiments, the entire crown 314 can be formed of material such as titanium or titanium alloy. Titanium and titanium alloy have high R-value, and if used in the end surface 320 and/or the crown 314 can aid in confining the heat generated during combustion to the combustion chamber, and shield other parts of the engine. This in turn allows more of the heat generated in the combustion chamber to go into movement of the pistons and into maintaining suitable temperature of the exhaust gas.

In one or more embodiments, the end surface 320 of the crown 314 also includes a thermal barrier coating (TBC) 333, discussed further below in relation to FIG. 4. The TBC 333 confines heat generated during combustion to the combustion chamber, thus shielding other parts of the engine and allowing for more of the heat of combustion to go into movement of the pistons (and, when applicable, into heating the exhaust gas to a suitable temperature for treatment before recirculation). In one or more embodiments, the piston 300 may include only the titanium or titanium alloy end surface 320 (and or a titanium/titanium alloy crown 314) without the TBC 333.

As shown in FIGS. 3B and 3C, the skirt part 316 includes an interior wall 323 that partially defines a cooling gallery 332. An outer peripheral portion of an under surface 336 of the crown 314 defines the remainder of the cooling gallery 332 in conjunction with the interior wall 323. The cooling gallery 332 serves as a conduit for cooling fluids such as oil to cool the piston 300.

As discussed above, intake and exhaust pistons in a pair of opposed pistons may differ in terms of structure, materials, or both. To account for the higher temperatures experienced by the exhaust piston, at least a portion of the exhaust piston may be made of one or more materials that are more suited to maintaining strength at higher temperatures than conventionally used materials such as steel or aluminum alloy. For example, in one or more embodiments, at least a portion of the exhaust piston may include titanium, a titanium alloy, a nickel alloy, a ceramic, a composite material, a cermet, or a combination of two or more of these. The exhaust piston may further include a thermal barrier coating, which in some embodiments is a layered or multi-component thermal barrier coating.

In one or more embodiments, in addition to including at least one material that is different from the materials used to form the intake piston, the exhaust piston may be shaped differently from the intake piston. For example, in one or more embodiments, the exhaust piston may have more or fewer structures than the intake piston to account for differences in coefficients of thermal expansion (CTE) between the intake piston and the exhaust piston. For example, in one or more embodiments, adequate clearance between the piston 300 and the cylinder bore in which the piston 300 is positioned can be provided by having a diameter of the sidewall 318 in the exhaust piston to be less than the diameter of the corresponding sidewall 318 in the intake piston. For another example, in one or more embodiments, shapes and sizes of the cooling galleries 332 can be different in the exhaust piston and the intake piston.

When two or more materials are used to construct the piston 300, differences in CTE associated with the different materials can impact a structural reliability of the piston 300. For example, CTE differences can cause deterioration or damage of the piston 300 at interfaces between materials, which in turn may lead to scuffing or seizing (or other types of wear) of the piston 300 in the cylinder bore within which the piston is disposed. In one or more embodiments, the exhaust piston can include coatings or materials between adjacent components (such as the skirt part 316 and the crown 314) formed of different materials, while such materials and coatings may be absent in the intake piston.

Differences in CTE additionally or alternatively may be present between the piston and its surroundings, such as between the piston rings and the engine cylinder liner (cylinder sleeve).

In one or more embodiments, the exhaust piston can include a piston skirt construction that is different from that of a corresponding piston skirt of the intake piston. The piston skirt construction for an exhaust piston can include a piston skirt that is made of a material that has a smaller coefficient of friction than the coefficient of friction of the material used to form the skirt of the intake piston. In one or more embodiments, materials that reduce friction between the cylinder bore and the piston skirt can include graphite and/or titanium with an interfacial layer of anodized or thermally grown titanium oxide. In some embodiments where the piston skirt includes titanium with anodized or thermally grown titanium oxide (e.g., titania), the titanium oxide can serve as a low friction material and can be provided on select portions of the piston skirt that can be expected to make contact with the cylinder. As shown in FIG. 3C, a low friction layer 337 is disposed on the sidewall 318, such as on the sidewall portions 368 of the skirt part 316 among other locations, where the low friction layer 337 can include the low friction materials discussed above.

In one or more embodiments, forming the exhaust piston and the intake piston with different materials may result in the pistons having different weights. For example, forming the exhaust piston with titanium or titanium alloys can result in the exhaust piston weighing less than the intake piston, which may be formed using iron or stainless steel. In some instances, to maintain overall balance in the opposed-piston engine, it is desirable that the exhaust piston and the intake piston weigh about the same. To achieve substantially equal weights, in one or more embodiments, size or dimensions of the exhaust piston can be designed to achieve a weight of the exhaust piston that is substantially equal to a weight of the intake piston. For example, in embodiments where the exhaust piston crown is manufactured using titanium or titanium alloys, the weight of the skirt part 316 can be increased such that the combined weight of the crown 314 and the skirt part 316 of the exhaust piston is substantially equal to the weight of crown 314 and the skirt part 316 of the intake piston. In one or more embodiments, the weight of the skirt part 316 can be increased by increasing a thickness of the skirt part 316 material.

As discussed above, in one or more embodiments, the exhaust piston can include a TBC 333 over the end surface 320 of the crown 314. In one or more embodiments, the TBC 333 can be partially made of a material with a high R-Value (R-Value is a measure of a material's resistance to heat flow). A TBC that includes a high R-Value material can aid in confining heat generated during combustion to the combustion chamber. This allows shielding other parts of the engine from the heat generated in the combustion chamber. Further, confining the heat to within the combustion chamber allows for more of the heat of combustion to be transformed into movement of the pistons and into heating the exhaust gas to a suitable temperature for treatment before recirculation (if applicable).

In one or more embodiments, the TBC 333 can include two or more layers of materials. In some such embodiments, alternating layers of the two or more materials can be used. Any suitable technique or combination of techniques can be used to form the TBC 333. For example, in one or more embodiments, the TBC 333 can be formed using one or more of a casting technique, a thermal spraying technique, a physical deposition technique, additive manufacturing, and the like.

In one or more embodiments, the piston 300 also can include a bonding layer (e.g., bond-coat) between the end surface 320 of the piston 300 and the TBC 333. In one or more embodiments, the TBC 333 can include multiple bonding layers (e.g., bonding layers of varying grain or particulate size). In one or more embodiments, the portion of the TBC 333 that is deposited over the bonding layer, can include one or more layers of graduated material composition and one or more layers of homogenous material composition. A TBC 333 layer with graduated material composition can have material proportions that vary as a function of thickness of the TBC 333 layer; while a TBC 333 layer having homogeneous material composition can have material proportions that remain substantially constant over an entire thickness of the TBC 333 layer. When a bonding layer is used, the bonding layer can be of a metallic material or other material that adheres well to the bulk material of the piston 300 or piston crown 314, as well as to the material of the TBC 333. The material of the TBC 333 can be any suitable material with an R-Value, a softening temperature, or an operating temperature range that is acceptable for the environment in which the exhaust piston will be situated.

The TBC 333 can be a graduated coating; the coating can be a mixture of two or more materials, one of which can be a bonding material (e.g., the material used in the bonding layer or bond-coat). In a graduated thermal barrier coating, the concentration or amount of a first material (e.g., bonding material) can be higher than that of a second material (e.g., material with a high R-Value) at the interface between the piston crown 314 and the thermal barrier coating. In such implementations, as one looks at the composition of the thermal barrier coating as a function of distance from the piston crown 314, the concentration or amount of the first material will become less, or smaller, while the concentration or amount of the second material increases.

In one or more embodiments, an overall thickness of the TBC 333 may be approximately 1 mm in thickness. In some such implementations, the bonding layer can account for about 10% of the overall thickness of the TBC 333. Alternatively, the bonding layer can have a thickness ranging from a few nanometers to about 100 microns. In some other embodiments, the bonding layer can be absent altogether. In embodiments where the TBC 333 includes multiple sublayers of thermal barrier material of differing composition or structure, the overall thickness of the sublayers can be about 90% or more of the overall thickness of the TBC 333. In such an assemblage, each individual layer can have the same thickness or each layer can have a different thickness. In one or more embodiments, one sublayer can differ from another sublayer in terms of one or more of crystal structure of the material, material density or porosity, and grain or particle size.

Figure 4:
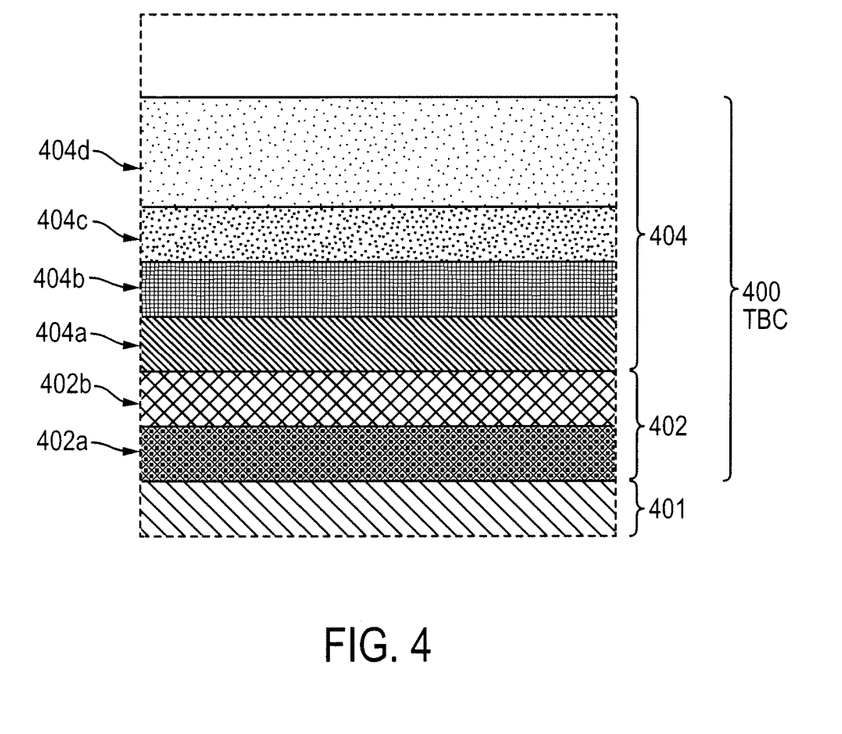
FIG. 4 depicts a cross-sectional view of a portion of an example exhaust piston with an example thermal barrier coating.

FIG. 4 depicts a cross-sectional representation of a thermal barrier coating 400 disposed over an example piston for use with a uniflow-scavenged opposed-piston engine. In one or more embodiments, the TBC 400 can be used to implement the TBC 333 discussed above in relation to FIGS. 3A-3C. The TBC 400 includes a bonding layer 402 and a thermal barrier layer 404. The bonding layer 402 is disposed on an end 401 of a piston while the thermal barrier layer 404 is disposed over the bonding layer 402. The bonding layer 402 includes a first bonding sub-layer 402a and a second bonding sub-layer 402b. The thermal barrier layer 404 includes a first 404a, a second 404b, a third 404c, and a fourth 404d thermal barrier sub-layer. In one or more embodiments, the TBC 400 may not include a bonding layer 402, and instead have the thermal barrier layer 404 directly disposed on the end 401 of the piston.

In one more embodiments, the bonding layer 402 can include materials that have CTE close to the CTE of the material used to form the piston and the CTE of the material used to form the thermal barrier layer 404. For example, in one or more embodiments, the CTE of a bonding material used for forming the bonding layer 402 is within about 5% to about 10% of the CTE of the material used for forming the piston, and is within 5% to about 10% of the CTE of a material used for forming the thermal barrier layer 404. In one or more embodiments, the bonding material used for forming the bonding layer 402 can include a metal. In one or more embodiments, a coarseness of the bonding material used on the first bonding sub-layer 402a can be different from a coarseness of the bonding material used in the second bonding sub-layer 402b. For example, the bonding material used in the second bonding sub-layer 402b can be coarser than that used in the first bonding sub-layer 402a. In one or more embodiments, a thickness of the first bonding sub-layer 402a can be different from a thickness of the second bonding sub-layer 402a. In one or more embodiments, the first bonding sublayer 402a can be thicker than the second bonding sublayer 402b. For example, in one or more embodiments, the thickness of the first bonding sublayer 402a can be about 50 microns to about 100 microns, or about 75 microns, and the thickness of the second bonding sub-layer 402b can be about 10 microns to about 35 microns, or about 25 microns. In one or more embodiments, the bonding material can include an oxidation-resistant metal or metal alloy, such as, for example, nickel-chromium-aluminum-yttrium (NiCrAlY) and/or nickel-cobalt-chromium-aluminum-yttrium (NiCoCrAlY).

In one or more embodiment, the thermal barrier layer 404 can include ceramic materials. For example, in some such embodiments, the thermal barrier layer 404 can include yttria stabilized zirconia (YSZ). YSZ has a high R-value, is stable over a wide range of temperatures, and has mechanical properties that are well suited for use in an internal combustion engine. In one or more embodiments, the thermal barrier layer 404 can include a bonding material in addition to the ceramic material. The inclusion of bonding material can improve the adhesion of the thermal barrier layer 404 to the underlying layers and can help in matching the overall CTE of the thermal barrier layer 404 with the CTE of the end 401 of the piston. For example, in one or more embodiments, the thermal barrier layer 404 can have graduated relative concentrations of the bonding material and the ceramic material over the thickness of the thermal barrier layer 404. In one such example, the concentration of the bonding material can decrease while the concentration of the ceramic material can increase from the first thermal barrier sublayer 404a through the fourth thermal barrier sublayer 404d. Specifically, for example, the first thermal barrier sublayer 404a can have a composition, by weight, of about 75% bonding material and about 25% ceramic material; the second thermal barrier sublayer 404b can have a composition, by weight, of about 50% bonding material and about 50% ceramic material; the third thermal barrier sublayer 404c can have a composition, by weight, of about 25% bonding material and about 75% ceramic material; and the fourth thermal barrier sublayer 404d can have a composition, by weight, of about 5% bonding material and about 95% ceramic material. Alternatively, in one or more embodiments, the fourth barrier sublayer 404d can have a composition, by weight, of about 0% bonding material and about 100% ceramic material. The above mentioned relative concentrations of the bonding material and the ceramic material are only examples, and other relative concentrations can be used as appropriate. In some other embodiments, one or more materials such as mullite, alumina, and rare-earth zirconates can be used in place of or in addition to YSZ.

In one or more embodiments, the thickness of one or more sublayers of the thermal barrier layer 404 can be different from the thickness of another sublayer of the thermal barrier layer 404. For example, in some such embodiments, the thickness of the first thermal barrier sublayer 404a can be about 50 microns to about 150 microns, or about 100 microns. The thickness of the second thermal barrier sublayer 404b can be about 25 microns to about 75 microns, or about 50 microns. The thickness of the third thermal barrier sublayer 404c can be about 25 microns to about 75 microns, or about 50 microns. The thickness of the fourth thermal barrier sublayer 404d can be about 500 microns to about 900 microns, or about 700 microns. In one or more embodiments, the thickness of the fourth thermal barrier sublayer 404d can be greater than the thickness of each of the other sublayers of the thermal barrier layer 404.

Figure 5:
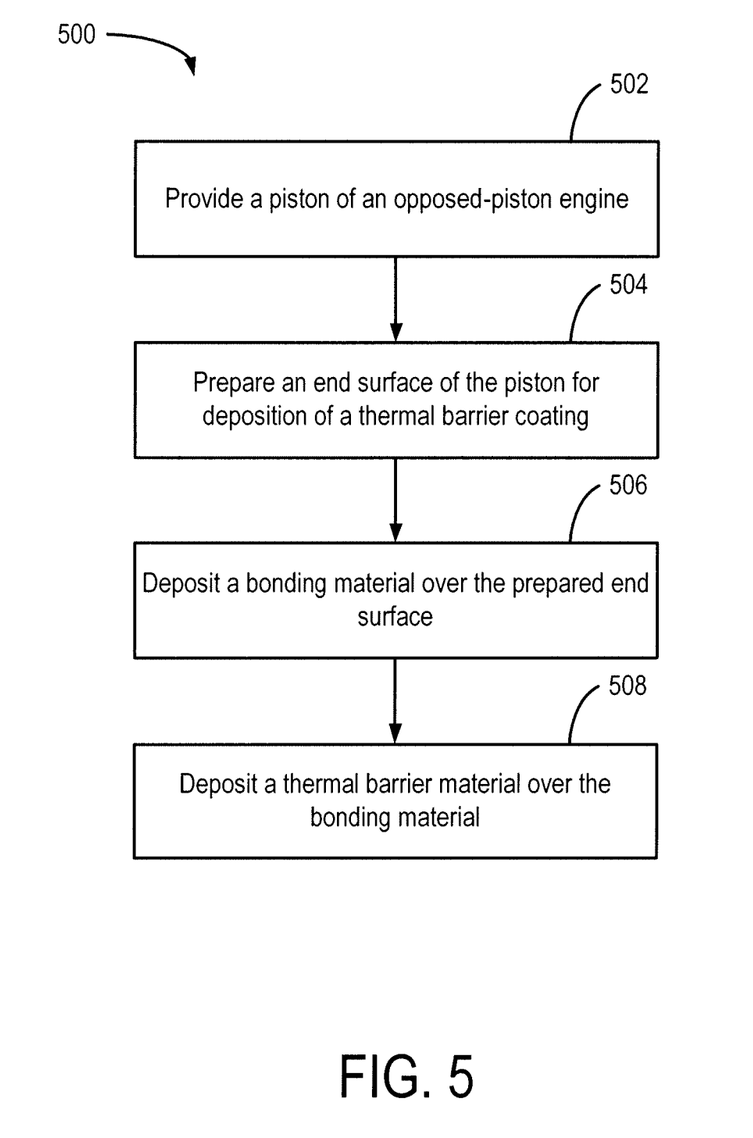
FIG. 5 shows a flow chart for an example method for forming a thermal barrier coating on an exhaust piston for use with an opposed-piston engine.

FIG. 5 shows a flow chart of an example method 500 for forming a thermal barrier coating on a piston. In one or more embodiments, the process 500 can be used to form the TBC 333 or the TBC 400 discussed above in relation to FIGS. 3A-3C and FIG. 4, respectively. The process 500 includes providing a piston of an opposed-piston engine (at 502). In one or more embodiments, providing a piston can include providing an exhaust piston of an opposed piston engine similar to the piston 300 discussed above in relation to FIGS. 3A-3C. The piston can include a skirt and a crown having an end surface, similar to the skirt part 316, the crown 314 and the end surface 320 of the piston 300. In one or more embodiments, the end surface 320 and/or the crown 314 can be made of materials such as titanium and/or titanium alloy. The method 500 further includes preparing the end surface of the piston for deposition of a thermal barrier coating (at 504). In one or more embodiments, preparing the end surface can include cleaning, polishing, roughening, etching, annealing, or any combination thereof. Such preparation can improve adhesion of the thermal barrier layer onto the prepared end surface of the piston.

The process 500 also includes disposing a bonding material over the prepared end surface (at 506). As discussed above in relation to FIG. 4, the bonding layer 402 can include bonding materials such as metal or metal alloys. Further the bonding layer 402 can include two or more sublayers, where each sublayer can have different properties such as thickness and/or coarseness of the bonding material. In one or more embodiments, the bonding material can be deposited on the end surface of the piston using one or more of a casting technique, a thermal spraying technique, a physical deposition technique, additive manufacturing techniques, and electrochemical deposition technique.

The process 500 further includes depositing a thermal barrier material over the bonding material (at 508). The thermal barrier material can include materials such as ceramics and other high R-value materials. In one or more embodiments, the thermal barrier layer can be deposited over the bonding material to form a thermal barrier layer similar to the thermal barrier layer 404 discussed above in relation to FIG. 4. In particular, the thermal barrier layer can include multiple sublayers composed of varying proportions of a bonding material and a thermal barrier material such as ceramic. In one or more embodiments, the thermal barrier material can be deposited on the bonding material using one or more of a casting technique, a thermal spraying technique, a physical deposition technique, additive manufacturing techniques, and an electrochemical deposition technique.

The process 500 may also include treating the piston after the deposition of the thermal barrier material. For example, in one or more embodiments, the piston can undergo an annealing process to improve the adhesion between the thermal barrier material and the bonding material. The annealing process can also improve the mechanical properties of the TBC by relieving post deposition shear stress within the deposited layers of thermal barrier material. In one or more embodiments, the piston can undergo further post TBC deposition processing such as oxidation of selected surfaces of the piston. For example, sidewall surfaces of the skirt part 316 (FIG. 3B) can be oxidized to create a low friction surface.

As discussed above, a piston for use in a uniflow-scavenged opposed-piston engine that includes at least one cylinder includes features for adapting the engine to variations in thermal conditions between an intake end and an exhaust end of the cylinder in the opposed-piston engine.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A piston for use in an opposed-piston internal combustion engine, the piston comprising:
 a substantially cylindrical portion including a sidewall;
 a piston crown located at an end of the piston, the piston crown comprising an end surface structured to form a combustion chamber when disposed within a cylinder bore in cooperation with an end surface of a cooperating opposing piston, the piston crown further comprising titanium or a titanium alloy; and
 a thermal barrier coating on the piston crown,
 wherein the end surface includes a depression extending between a first peripheral edge of the end surface and a second peripheral edge of the end surface, wherein at least one of the first peripheral edge or the second peripheral edge is positioned to align with a fuel injection location on the cylinder bore when the piston is located at a particular position with respect to the cylinder bore and such that fuel can be provided from the fuel injection location to the depression when the at least one of the first peripheral edge or the second peripheral edge is aligned with the fuel injection location.

2. The piston of claim 1, wherein the substantially cylindrical portion defines a first set of ring grooves and a second set of ring grooves spaced apart from the first set of ring grooves along a longitudinal axis of the substantially cylindrical portion.

3. The piston of claim 2, wherein the substantially cylindrical portion defines a wristpin bore positioned between the first set of ring grooves and the second set of ring grooves.

4. The piston of claim 1, wherein the thermal barrier coating comprises a bonding layer comprising a bond-coat material.

5. The piston of claim 4, wherein the bond-coat material comprises a metal or metal alloy.

6. The piston of claim 1, wherein the thermal barrier coating comprises a material with a high R-Value.

7. The piston of claim 1, wherein the thermal barrier coating comprises a ceramic material.

8. The piston of claim 7, wherein the thermal barrier coating comprises yttria stabilized zirconia (YSZ).

9. The piston of claim 7, wherein the thermal barrier coating comprises two or more layers, each of the two or more layers of the thermal barrier comprising different amounts of the ceramic material.

10. The piston of claim 9, wherein each of the two or more layers of the thermal barrier coating comprises different amounts of a bond-coat material and different amounts of the ceramic material.

11. The piston of claim 9, wherein at least one layer of the two or more layers of the thermal barrier coating has a thickness that is equal to a thickness of another layer of the two or more layers of the thermal barrier coating.

12. The piston of claim 1, wherein the cylindrical portion comprises titanium, a titanium alloy, or graphite.

13. The piston of claim 1, wherein an outer surface layer of the sidewall comprises titanium oxide.

14. The piston of claim 13, wherein the outer surface layer comprises thermally grown titanium oxide.

15. The piston of claim 1, wherein the end surface comprises steel, an aluminum alloy, titanium, a titanium alloy, a nickel alloy, or a combination of two or more of steel, an aluminum alloy, titanium, a titanium alloy, and a nickel alloy.

16. The piston of claim 1, wherein the end surface comprises one or more of steel, aluminum alloy, titanium, a titanium alloy, and a nickel alloy.

17. The piston of claim 1, further comprising grooves in the sidewall, the grooves configured to receive one or more piston rings, wherein the grooves are further configured to accommodate differences in thermal expansion between materials of the piston sidewall and materials of the piston rings.

18. The piston of claim 1, wherein the thermal barrier coating has an overall thickness and comprises a bonding layer, the bonding layer comprising about 10% of the overall thickness.

19. The piston of claim 1, wherein the thermal barrier coating is a graduated coating comprising a bonding material and a material with a high R-Value.

20. A method of making a piston for an opposed-piston engine, the method comprising:
 providing a piston, the piston comprising:
  a substantially cylindrical portion including a sidewall; and
  a piston crown located at an end of the piston, the piston crown comprising an end surface structured to form a combustion chamber when disposed within a cylinder bore in cooperation with an end surface of a cooperating opposing piston;
 depositing a bonding layer including a bonding material on the end surface of the piston crown; and
 depositing at least one thermal barrier layer comprising ceramic material above the bonding layer,
 wherein depositing at least one thermal barrier layer comprising ceramic material above the bonding layer includes depositing a plurality of thermal barrier sublayers, each of the plurality of sublayers including a proportion of the ceramic material and a proportion of the bonding material, and wherein the proportion of the ceramic material decreases and the proportion of the bonding material increases with the depth of the thermal barrier layer.

21. The method of claim 20, wherein providing a piston includes providing the piston where the end surface includes at least one of steel, aluminum alloy, titanium, a titanium alloy, or a nickel alloy.

22. The method of claim 21, wherein depositing a plurality of thermal barrier sublayers includes depositing at least one sublayer of the plurality of thermal barrier sublayers with a thickness that is different from a thickness of another sublayer of the plurality of thermal barrier sublayers.

23. The method of claim 21, wherein depositing at least one thermal barrier layer comprising ceramic material above the bonding layer includes depositing a ceramic material including at least one of yttria stabilized zirconia, mullite, alumina, or rare-earth zirconates.

24. A piston for use in an opposed-piston internal combustion engine, the piston comprising:
 a substantially cylindrical portion including a sidewall;
 a piston crown located at an end of the piston, the piston crown comprising an end surface structured to form a combustion chamber when disposed within a cylinder bore in cooperation with an end surface of a cooperating opposing piston, the piston crown comprising titanium or titanium alloy,
 wherein the end surface includes a depression extending between a first peripheral edge of the end surface and a second peripheral edge of the end surface, wherein at least one of the first peripheral edge or the second peripheral edge is positioned to align with a fuel injection location on the cylinder bore so as to receive fuel from the fuel injection location, the alignment occurring at one location of the piston relative to the cylinder bore.

25. The piston of claim 24, the substantially cylindrical portion defines a first set of ring grooves and a second set of ring grooves spaced apart from the first set of ring grooves along a longitudinal axis of the substantially cylindrical portion.

26. The piston of claim 25, wherein the substantially cylindrical portion defines a wristpin bore positioned between the first set of ring grooves and the second set of ring grooves.

27. The piston of claim 24, wherein the cylindrical portion comprises titanium, a titanium alloy, or graphite.

28. The piston of claim 24, wherein an outer surface layer of the sidewall comprises titanium oxide.

29. The piston of claim 28, wherein the outer surface layer comprises thermally grown titanium oxide.

30. The piston of claim 24, wherein the piston crown further includes a thermal barrier coating on the piston crown.

31. The piston of claim 30, wherein the thermal barrier coating comprises a bonding layer comprising a bond-coat material.

32. The piston of claim 30, wherein the thermal barrier coating comprises a material with a high R-value.

33. The piston of claim 30, wherein the thermal barrier coating comprises a ceramic material.

\* \* \* \* \*